United States Patent Office 3,399,869
Patented Sept. 3, 1968

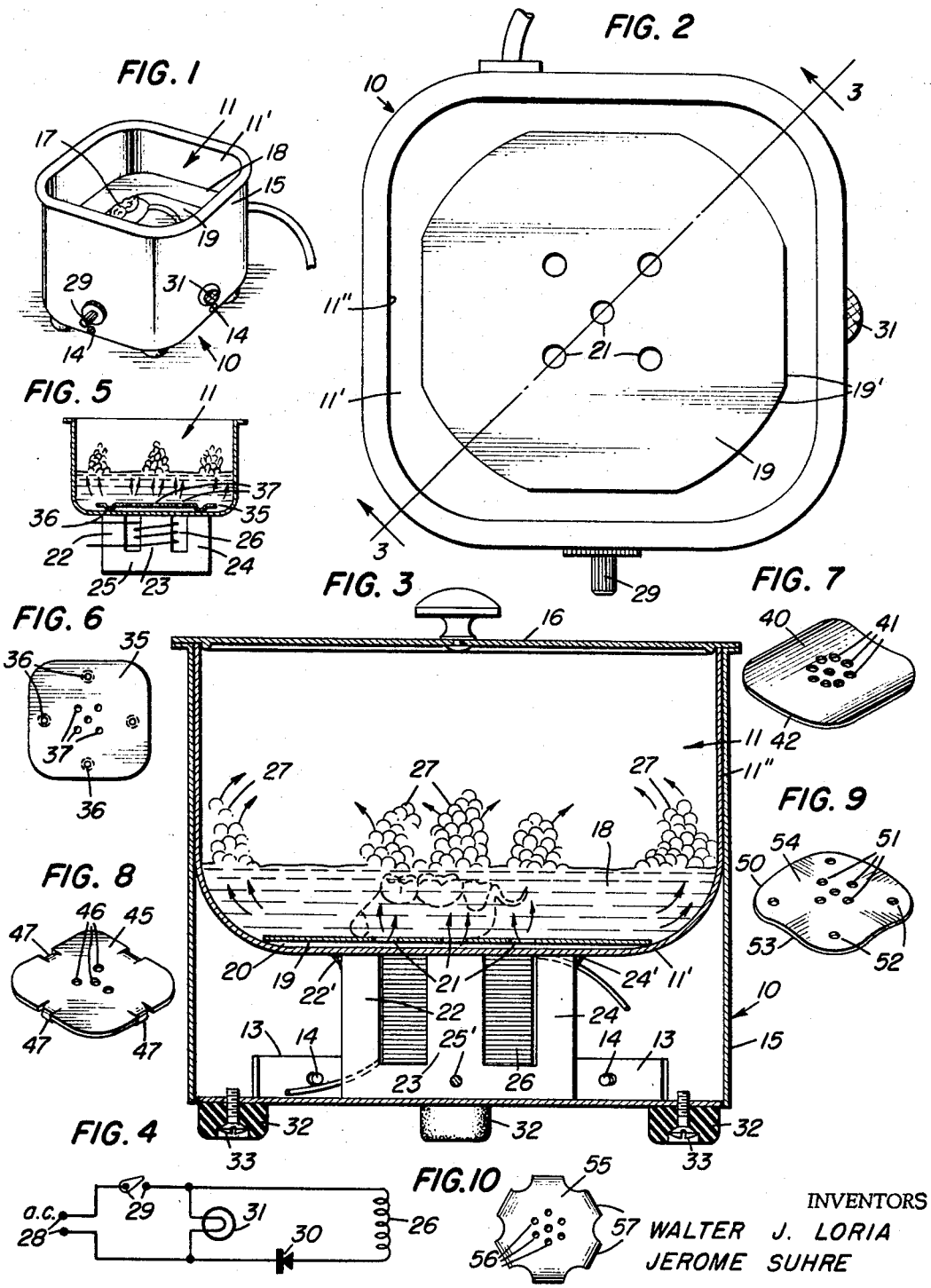

3,399,869
LIQUID AGITATING DEVICE
Walter J. Loria, 420 E. 86th St., New York, N.Y. 10028, and Jerome Suhre, 2370 Seneca Road, Scotch Plains, N.J. 07076
Filed Aug. 31, 1967, Ser. No. 664,870
26 Claims. (Cl. 259—114)

ABSTRACT OF THE DISCLOSURE

A liquid agitating device comprising a receptacle formed of nonmagnetic material with upwardly extending sides and an imperforate bottom for holding liquid therein. This device is provided with an electromagnet having spaced poles facing the underside of said bottom and a mechanically unconnected liquid agitator plate of paramagnetic material of a size laterally sufficient to bridge the spacing of said poles and fitting loosely in the receptacle over said bottom with a surface noncomplementary to the adjacent surface of said bottom having a part slightly spaced therefrom and means for providing a pulsating energizing current to the electromagnet whereby the part of said agitator plate spaced from said bottom is drawn periodically toward said bottom so as forcibly to expel liquid from space between said plate and bottom into the receptacle space above the plate and alternately is released so as to allow return flow of liquid therebetween.

---

This invention relates to liquid agitating devices, and particularly to such devices used as cleaning devices, such as denture and jewelry cleaners.

An object of this invention is to provide an improved liquid agitating device.

Another object of the present invention is to provide an improved denture cleaning device.

A further object of this invention is to provide an improved cleaning device wherein cleaning liquid in a receptacle is vigorously agitated for cleaning an article therein.

Further objects and advantages of this invention will become apparent from the following description referring to the accompanying drawing, and the features of novelty which characterize this invention will be pointed out with particularity in the claims appended to and forming a part of this specification.

In accordance with the present invention, an improved liquid agitating device is provided which is especially useful and efficient for cleaning articles by agitated cleaning liquid. The liquid is adapted to be contained in a receptacle having an imperforate bottom and upwardly extending sides, so that articles, such as dentures, jewelry, and the like, can be easily immersed in and removed from the liquid.

It is especially important that cleaners of this type be constructed so that the articles being cleaned be not damaged by moving parts of the cleaner. This is assured in the present invention by subjecting the article being cleaned only to the soft scrubbing action of agitated liquid. The cleaning liquid is vigorously agitated by a smooth surfaced plate which is activated solely by electromagnetic forces without any mechanical actuator or connection. This liquid agitator plate is made of paramagnetic material and it acts as a diaphram pump which forcibly expels the liquid through perforations in the plate and around the side edges thereof as it is magnetically drawn toward the bottom of the receptacle. The liquid produces jets or fountains which bubble vigorously yet softly flush away foreign matter from the surfaces of the article being cleaned, and there is no possibility of damage to the article from the smooth pulsating agitator plate which lies loosely on the bottom of the receptacle.

The pulsations of the agitator plate are provided by its function as an armature actuated by an electromagnet located under the bottom of the receptacle and energized by a unidirectional pulsating electric current, such as is obtainable by a source of half-wave alternating current. As will be explained, this type of electromagnetic excitation is particularly useful in providing the desired pumping action by the agitator plate.

Details of the present invention will be better understood from the following description referring to the accompanying drawing in which:

FIG. 1 is a perspective view of a cleaning device embodying the present invention;

FIG. 2 is a plan view of the device shown in FIG. 1;

FIG. 3 is a sectional view of the device shown in FIGS. 1 and 2, taken along line 3—3 of FIG. 2, and additionally illustrating the liquid agitation in such a device when in operation;

FIG. 4 is a schematic circuit diagram of the circuitry for devices as shown in the other figures;

FIG. 5 is a schematic sectional view, similar to FIG. 3, illustrating another type of agitator plate;

FIG. 6 is a plan view of the agitator plate shown in FIG. 5;

FIG. 7 is a perspective view of another embodiment of an agitator plate;

FIG. 8 is a perspective view of yet another form of agitator plate;

FIG. 9 is a perspective view of another agitator plate; and

FIG. 10 is a plan view of a further type agitator plate.

Referring to the drawing, FIGS. 1, 2, and 3 illustrate an embodiment of the present invention particularly useful as a cleaning device for dentures, jewelry, and similar relatively small and delicate articles. The device includes a container 10 formed of nonmagnetic material, such as nonmagnetic stainless steel, glass, ceramic, or plastic, or a combination of these. Preferably, the container 10 includes an article and cleaning liquid holding inner receptacle 11 having an imperforate bottom 11' and upwardly extending sides 11". This receptacle 11 is conveniently held in operative position by being fitted snugly into the end of another open-mouthed nonmagnetic container, which may be a unitary cup-shaped unit or may comprise a bottom 12 having upwardly extending projections or lugs 13 secured to the upper surface thereof spaced around the periphery and held in position by small screws 14 extending through upwardly extending container sides 15 and screwed into tapped poles in the projections 13. The container 10 may have any suitable contour, such as cylindrical, squared section, or other practical form, and a suitable cover 16 preferably is fitted to the open end of the receptacle 11.

Cleaning of a denture 17, FIGS. 1 and 3, or other article, is performed by vigourously agitating cleaning liquid 18 in the receptacle 11 in which the article is immersed. This agitation of the liquid 18 is provided by an agitator plate 19 formed of paramagnetic material, such as sheet magnetic stainless steel. The agitator plate may have any suitable configuration which provides a free loose fit within the receptacle over the bottom thereof. It should be formed relative to the receptacle bottom 11', so that the surface of the agitator plate adjacent to the receptacle bottom 11' does not have a perfect complementary even fit thereon in order to provide for the passage of liquid into a clearance space 20 between the plate 19 and the bottom 11' of the receptacle. This may be achieved in numerous ways. As shown in FIG. 3, the bottom 11' of the receptacle is joined to its sides 11" by a smoothly rounded section which provides a concave nonplanar inner surface to the bottom. The plate 19 illustrated in this figure is a substantially flat planar unit, and has transverse dimensions such that it rests with its edges on the curved concave section thereby providing a slight clearance or space 20 between the adjacent surfaces of the agitator plate 19 and the bottom 11' of the receptacle. In addition, the edges 19", FIG. 2, of the agitator plate preferably are of a contour generally that of the receptacle so as to present a somewhat irregular plate periphery spaced from the sides of the receptacle. A greater efficiency also is obtained by preferably providing a plurality of perforations 21 through the agitator plate. These perforations may be formed at scattered points or may have a regular pattern and may be clustered near the center as shown in FIG. 2, or may also be near the edges of the plate. The purpose of the perforations 21 and of the configuration of the plate which allows space between the sides of the receptacle and the edges of the plate is to facilitate the passage of liquid between the space 20 and the liquid above the plate. This passage of liquid is provided by a pumping action of the agitator plate when it is suitable magnetically excited.

In order to obtain the desired magnetic excitation of the agitator plate, a source of pulsating excitation is provided which alternately attracts the plate downwardly toward the bottom of the receptacle and releases it. This can conveniently be done by an electromagnet having spaced poles facing the underside of the bottom of the receptacle and which is energized by a pulsating electric current. As shown in FIG. 2, the electromagnet comprises a stacked laminated core having three legs 22, 23, and 24 extending upwardly from a base 25. This stacked core can conveniently be secured together by a suitable through bolt 25' and additionally be spot welded, as at 22' and 24', to the underside of the receptacle bottom 11'. In order to obtain the desired smooth pumping action, the agitator plate should be of a size laterally sufficient to bridge the spacing of the electromagnet poles 22-24. This also assures a more uniform movement and flexing of the agitator plate. The laminations of this core preferably are formed of magnetically soft iron so that they will not become strong permanent magnets, and excitation is provided by a suitable coil 26 wound around the middle leg 23 of the core in the spaces between the three legs.

The desired pulsating excitation is obtained by energizing the coil 26 by a suitable pulsating electric current, and it has been found that a very effective agitation of the liquid is obtained by spacing the pulsations, so that during the deenergized period between pulses the agitator plate 19 is released and moves upwardly away from the receptacle bottom 11', causing liquid to pass around its edges and through the perforations 21 into the space 20 between the plate 19 and the receptacle bottom. Energization of the coil 26 draws the plate 19 downwardly causing the liquid to be forcibly ejected upwardly through the perforations 21 and around the edges of the plate. It has been found that where this energization is suitably pulsed to enable the agitator plate to be moved intermittently toward and away from the bottom 11', the resultant liquid pumping action produces vigorous jets or fountains 27 which effectively scrub clean the article immersed in the cleaning liquid 18. In addition, the pumping action of the agitator plate 19 appears most effective when the thickness of the plate and its elasticity are such that it is deflected downwardly by the magnet, so that it tends to spring deflect upwardly when it is released during the unenergized period between the magnetic attractions. This is another reason for supporting the plate spaced from the bottom of the receptacle.

FIG. 4 shows schematically an electric circuit which has been found to give the desired energization to the electromagnet. In this circuit, the electromagnet coil 26 is adapted to be energized from a suitable source of alternating current 28 by closure of its circuit through a switch 29 and a diode rectifier 30. Thus, alternate half waves of the alternating current pass through the coil 26 and the diode 30, providing a unidirectional pulsating energization between equal periods of deenergization. This has been found to produce the ideal pulsating pumping action by the agitator plate 19.

As shown in FIG. 4, a signal light 31 preferably is connected across the coil 26 and diode 30, so that it will be lighted whenever the switch 29 is closed. This is a safety feature, in that, if the agitator plate is removed from the receptacle, the current could be on, yet there would be no indication thereof by any physical movement of the liquid or of the device. In addition, in most instances it is desirable to provide cushions or pads 32 of rubber or the like suitably secured as by screws 33 to the underside of the container 15.

Another embodiment of the invention is illustrated schematically in FIGS. 5 and 6. The receptacle 11 may be of the same general type as that previously described, and the electromagnetic excitation may be provided by the coil 26 and the core 22-23-24-25 as in the FIGS. 1-4 embodiment. In this construction, the agitator plate 35 is substantially planar, as in the FIG. 3 structure, and is spaced from the receptacle bottom by a plurality of substantially equally angularly spaced projections 36, which may conveniently be pressed outwardly from the plate 35 or secured thereto in the form of welded feet or through bolts or screw heads. This plate should be placed loosely in the receptacle with the projections or nodules 36 on the face thereof adjacent to the receptacle bottom as shown in FIG. 5. The agitator plate 35 is made of a paramagnetic sheet material and the receptacle of nonmagnetic material, as in all of the embodiments of this invention. Preferably, a plurality of perforations 37 also are formed through the plate 35 to aid in providing the desired jet liquid action.

FIG. 7 shows one of the preferred forms of agitator plate for use in a device as disclosed in the previously described figures. This plate 40 is formed of a paramagnetic sheet material with a clustered plurality of perforations 41 centrally of the plate. In this embodiment the plate is made with a slight curvature or V-deformation 42 at least across one transverse direction. It has been found that such a plate is particularly efficient and quiet operating when placed loosely on the receptacle bottom with the central curved or V-deformed portion extending upwardly from the receptacle bottom; that is, when it is turned upside-down from the position shown in FIG. 7. This plate functions very well also when placed in the position shown in this figure with the upturned edges extending upwardly.

FIG. 8 illustrates a further modification of an agitator plate. In this construction, the plate 45 is substantially planar and is provided with a plurality of central perforations 46 for the previously explained purposes. The spacing of the plate from the bottom of the receptacle is obtained in this embodiment by a plurality of outwardly extending projections in the form of tabs 47 punched and pressed at equally angularly spaced points around the edges of the plate so as to form feet to support the plate spaced slightly upwardly from the receptacle bottom on which they rest loosely. The operation of this plate is similar to those previously described when used in a device of the type shown in FIGS. 1-5.

FIG. 9 illustrates a further embodiment of the present invention in which an agitator plate 50 somewhat similar to those of FIGS. 2 and 7 is provided having a central cluster of perforations 51, with additional perforations 52 spaced nearer the edges of the plate. This plate is shown formed with a double curved or double crossed V-shaped configuration with the apices 53 and 54 of the V's substantially at right angles. This type plate functions well in both positions, with the concave side facing both toward and away from the bottom of the receptacle, although better in the former position.

FIG. 10 shows yet another type agitator plate 55 having a central cluster of perforations 56 and formed with a scalloped irregular edge contour 57. The scallops of the edge 57 are turned axially inwardly to give the plate a slight concavity. Such a plate also functions with the concave side facing toward and away from the receptacle bottom, but better in the former position.

The more simple plates of FIGS. 2, 7, and 9 are preferred both because of the greater agitation and smoother surface of the plate with which the article being cleaned comes into contact. In addition, these have been found to provide a more quiet operation.

While particular embodiments of this invention have been illustrated and described, modifications thereof will occur to those skilled in the art. It is to be understood, therefore, that this invention is not to be limited to the particular details and uses disclosed, and it is intended in the appended claims to cover all modifications within the spirit and scope of this invention.

The invention claimed is:

1. A liquid agitating device comprising a receptacle formed of nonmagnetic material adapted to receive and hold liquid, said receptacle having sides and a closed bottom, an electromagnetic excitation means having spaced poles under said receptacle bottom, a liquid agitating armature comprising a mechanically unconnected plate of paramagnetic material of a size laterally sufficient to bridge the spacing of said poles and smaller than the receptacle inner periphery formed by the receptacle sides, and means for energizing said electromagnetic excitation means by a pulsating source of energization whereby said armature plate is periodically drawn toward said receptacle bottom causing cleaning liquid to be forcibly expelled from space between said plate and said receptacle bottom into the receptacle space above said plate.

2. A device as defined in claim 1 wherein said armature comprises a plate having contours substantially the same as the inner periphery of said receptacle and substantially less in size providing a clearance between the outer edges of said plate and the adjacent sides of said receptacle, said receptacle bottom being nonplanar and said plate being substantially flat and of a thickness capable of being flexed under the excitation provided by said electromagnetic exciting means.

3. A liquid agitating device as defined in claim 1 wherein said armature is made of sheet material and has a surface noncomplementary to the adjacent surface of said receptacle bottom on which it has an uneven fit and provides space therebetween into which liquid can flow.

4. A device as defined in claim 3 wherein said armature plate has at least one perforation therethrough whereby said energization of said electromagnetic excitation means causes liquid to be forcibly expelled through said perforation upwardly into said receptacle from space between said plate and said receptacle bottom.

5. A device as defined in claim 3 wherein said plate has a plurality of perforations therethrough in the central area of the plate through which the liquid is forcibly expelled upon said energization of said electromagnetic excitation means.

6. A device as defined in claim 3 with means for indicating when said exciting means is energized.

7. A device as defined in claim 3 wherein said means for energizing said exciting means comprises means for providing a unidirectional pulsating current to said exciting means.

8. A device as defined in claim 7 wherein said means for energizing said electromagnetic exciting means comprises a diode and a switch connected for energizing said latter means from a source of alternating current through said diode connected so as to energize said excitation means only on alternate half cycles of the alternating current to provide said pulsating current.

9. A cleaning device as defined in claim 1 wherein said armature plate has a configuration relative to said receptacle bottom so as to form a space therebetween when said plate rests freely on said bottom such that energization of said excitation means flexes said plate in drawing it toward said receptacle bottom.

10. A cleaning device as defined in claim 9 wherein said receptacle bottom is concave and said armature plate is of a size such that its edges rest on said receptacle concave bottom and support the face of said plate adjacent to said bottom in spaced relation thereto forming a space therebetween.

11. A cleaning device as defined in claim 9 wherein said plate configuration comprises means for positioning the edges of said plate spaced upwardly from the central portion of said receptacle bottom so as to form a space between said plate and said central bottom portion.

12. A cleaning device as defined in claim 11 wherein said plate edge positioning means comprises a plurality of substantially equally angularly spaced projections pressed outwardly from said plate on the face thereof adjacent to said receptacle bottom.

13. A cleaning device as defined in claim 11 wherein said plate has a plurality of perforations therethrough through which the liquid is forcibly expelled upwardly upon energization of said excitation means.

14. A cleaning device as defined in claim 11 wherein said plate has an irregular edge contour whereby said edges do not have full engagement fit on said receptacle bottom when said plate is at rest thereon such that liquid is forcibly expelled from around the edges thereof upon said energization of said excitation means.

15. A cleaning device as defined in claim 11 wherein said plate edge positioning means comprises a plurality of spaced projections on the face of said armature plate facing said receptacle bottom.

16. A cleaning device as defined in claim 15 wherein said plate has a plurality of perforations therethrough through which the liquid is forcibly expelled upwardly upon energization of said excitation means.

17. A cleaning device as defined in claim 15 wherein said plate has an irregular edge contour whereby said edges do not have a full engagement fit on said receptacle bottom when said plate is at rest thereon such that liquid is forcibly expelled from around the edges thereof upon energization of said excitation means.

18. A device as defined in claim 15 with an electric light connected for energization when said excitation means is energized.

19. A cleaning device as defined in claim 1 wherein means are provided on said plate for supporting it in said spaced relation to said receptacle bottom.

20. A device as defined in claim 1 wherein said electromagnetic excitation means has three spaced poles one of which is under substantially the center of said receptacle bottom and the outer two are of opposite polarity to the center pole, said plate having an irregular edge contour whereby liquid is forcibly expelled from around the edges thereof upon said energization of said excitation means.

21. A device as defined in claim 20, wherein said plate has a plurality of perforations therethrough through which the liquid also is forcibly expelled upwardly upon energization of said excitation means.

22. A device as defined in claim 20 wherein said means for energizing said exciting means comprises means for providing a unidirectional pulsating current to said exciting means and with means for indicating when said energization is being provided.

23. A device as defined in claim 22 wherein said plate has a plurality of perforations therethrough and has a concave configuration.

24. A device as defined in claim 23 wherein said plate is of a thickness rendering it flexible for flexing under excitation by said electromagnetic means.

25. A device as defined in claim 20 wherein said plate has a slight V-deflection of its surfaces forming a deflection from a plane surface.

26. A device as defined in claim 20 wherein said plate has a crossed V-deflection of its surfaces and a central cluster of perforations therethrough.

References Cited

UNITED STATES PATENTS

| | | | |
|---|---|---|---|
| 2,616,820 | 11/1952 | Bourgeaux | 134—184 X |
| 2,724,393 | 11/1955 | Heise | 134—184 X |
| 2,896,649 | 7/1959 | Faidley | 134—184 |

ROBERT W. JENKINS, *Primary Examiner.*